United States Patent Office 3,004,129
Patented Oct. 10, 1961

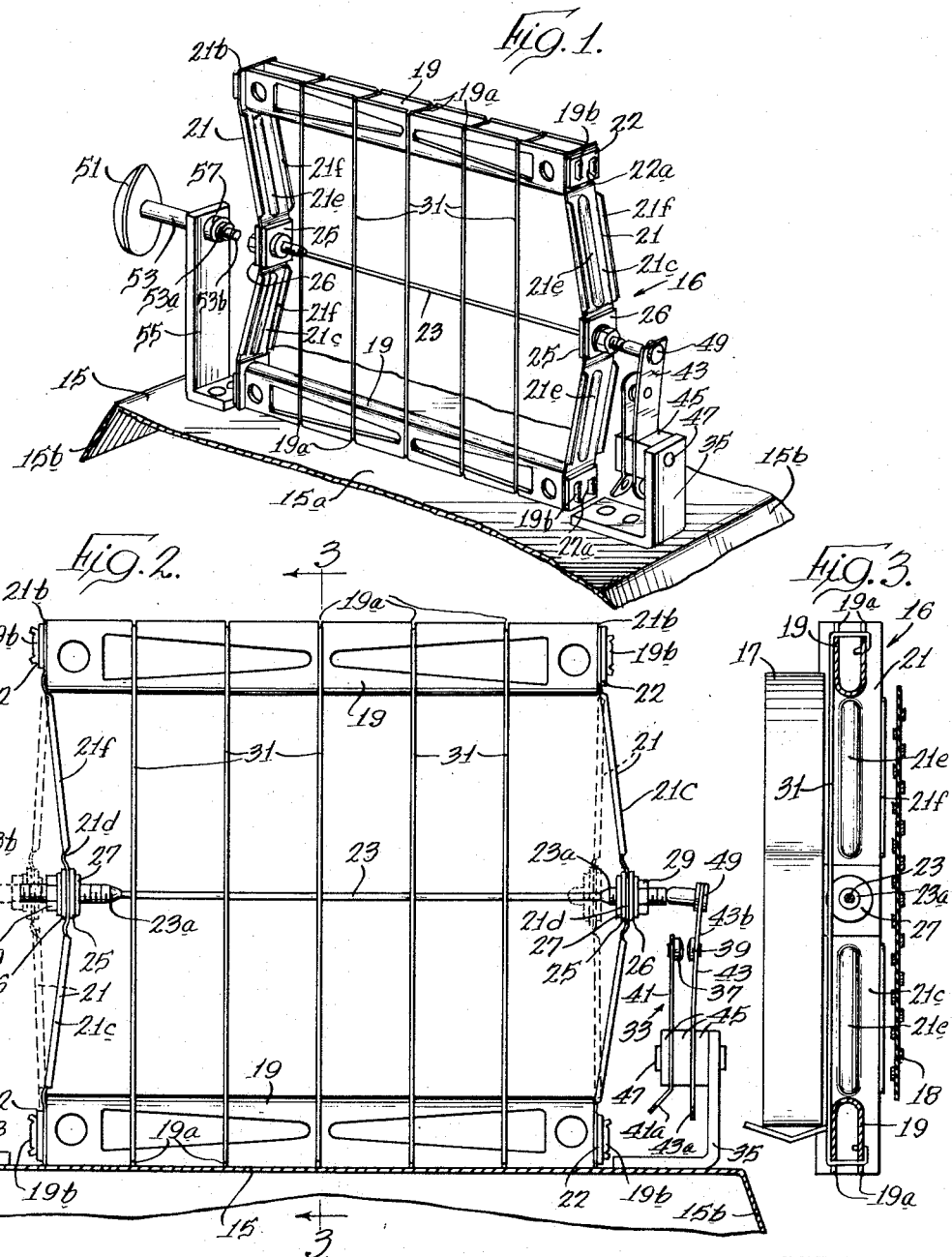

3,004,129
THERMAL RESPONSIVE DEVICE
Ludvik J. Koci, Hinsdale, Ill., assignor to Sunbeam Corporation, Chicago, Ill., a corporation of Illinois
Filed July 14, 1958, Ser. No. 748,225
4 Claims. (Cl. 219—19)

The present invention relates to cooking devices for heat treating food, and more particularly relates to thermostat control means for automatic toasters.

In recent years the automatic bread toaster has become one of the most widely used electric home appliances. In its present form, the automatic toaster represents a complicated mechanism which is provided with means for terminating the toasting cycle when the bread has been cooked a desired amount. Almost all of the automatic toasters marketed today are of the pop-up type, in which a movable bread carriage is provided to elevate the toasted bread to a position at least partially outside of the toaster casing or shell upon termination of the toasting cycle.

Most of the activity of the toaster art has been directed towards the design of a satisfactory control means for regulating the length of the cooking cycle. Through development and experimentation, the types of toaster controls in widespread commercial use have been reduced to two basic types which are used on almost all present day toasters. The thermal timer type of control provides a cooking interval which is determined by the length of time required to deflect a bimetallic member heated by a small resistance heater connected in series with the main heating elements of the toaster. By using the small heater whose output varies with line voltage, and by locating the bimetal within the toaster shell where it is subject to the ambient temperature within the toaster, this type of thermostat may be easily compensated for changes in line voltage and compensated for the difference in toasting time required after varying periods of use because of increases in temperature in the toaster. This method of control provides an inexpensive means of timing the toasting cycle but has a number of serious limitations. With proper compensation, it is possible to obtain a fairly uniform product with a thermal timer control if a uniform type and quality of bread is always used in the toaster. This condition, of course, is not practical, as the average housewife normally toasts not only different types of bread but also bread of different ages and different initial temperatures. Rye, wholewheat and white breads may require different cooking times which would not be compensated for by a thermal timer control. Fresh bread or bread recently taken from a freezer would require longer cooking times than stale bread or bread at room temperature. Because of these limitations in the accuracy of control by a thermal timer, the surface temperature responsive control means for regulating toasting cycles are regarded as preferable.

Research and experimentation has determined that the surface color of toast, or the degree of charring as it actually is, varies directly with the surface temperature of the bread during the toasting cycle. The surface temperature of the bread increases quite slowly as the moisture is driven out of the bread during the cooking operation. As the moisture is driven off the surface of the bread, it begins to brown or char slightly and the surface temperature begins to go up. By utilizing this temperature change to control the cooking cycle it is possible to obtain uniformly toasted bread regardless of the initial bread conditions of temperature, freshness and the like.

Because of the low heat capacity and the extremely porous and delicate nature of bread, it is difficult to devise a satisfactory means to measure the surface temperature of the bread for use in controlling the toasting cycle. Some of the early efforts along this line are disclosed in the early Hurxthal patents, namely, United States Pat. Nos. 1,540,628, 1,857,085 and 1,957,343. These patents disclose the use of a single expandable element placed in proximity to the surface of the bread being toasted to respond to the temperature thereof. This type of construction was embodied in the very old style toasters and has found little application in the present day pop-up toaster. It would be desirable to utilize the expandable wire principle of temperature sensing in connection with a control means for a pop-up toaster. It would also be desirable to modify the expandable wire thermostat so that it would respond to substantially the entire surface area of the bread being toasted.

Almost all types of control mechanisms utilized to regulate the toasting cycle include many links and levers which, because of the high temperatures to which the toaster is subjected, tend to create frictional problems in the operation of the control mechanism. Any variation in the amount of friction between the moving parts of the mechanism tends to eliminate the consistency of response. This problem is augmented by the fact that a considerable amount of work must usually be performed by the control mechanism. This work takes the form of operating an electrical switch which is connected in series with the toaster elements and most important releasing the carriage latch which retains the bread carriage in the lowered position against the action of some type of biasing spring. The friction associated with the carriage latch or the mechanism which engages the carriage latch may often vary to such an extent that the toasting is variable and erratic. It would be desirable, therefore, to provide a substantially frictionless control mechanism which deliver enough energy to release the carriage latch quickly at a selected time.

It is accordingly an object of the present invention to provide a new and improved surface temperature responsive control for an automatic toaster.

It is a further object of the invention to provide an improved expandable wire thermostat control means for an electric toaster.

It is an additional object of this invention to provide an expandable wire thermostatic control means having a snap action motion.

It is an additional object of the invention to provide a toaster control switch which operates with substantially no frictional losses.

It is an additional object of the invention to provide a surface temperature responsive thermostat which acts with a snap action to prevent contact arcing.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of the expandable wire thermostatic control means of the present invention mounted on a toaster base with the shell and carriage mechanism cut away;

FIG. 2 is a side elevational view of the control mechanism shown in FIG. 1; and

FIG. 3 is a sectional view of FIG. 2 taken along line 3—3 of FIG. 2.

As was mentioned above, the thermostatic control means of the present invention utilizes the principle of the expandable wire thermostatic control means disclosed in the patent to Hurxthal No. 1,540,628. By employing a number of expandable wire members which are positioned adjacent the surface of the bread, it is possible to obtain response to a more representative area of the bread and to obtain a greater force to operate the control mechanism. A plurality of expandable wire members are utilized to actuate an over-center spring mechanism which is adapted to terminate the toasting cycle. In an effort to simplify the description of the subject invention, the shell, the carriage mechanism and the heating elements have been eliminated from the showing of the toaster embodying the invention.

A cup-shaped toaster base member 15 may be utilized to support a control mechanism 16. The cup-shaped base member 15 may have a flat supporting portion 15a and downwardly extending sidewalls 15b which serve to position the support portion 15a in horizontal spaced relation to the table or surface upon which the toster may be placed. The base 15 would support the toaster shell, the heating elements and the movable carriage mechanism.

In the sectional view of FIG. 3 the relative positions of a piece of bread 17, the control mechanism 16 and a mica-wound heading element 18 are shown. The control mechanism 16 is made up of a pair of transversely extending channel-shaped frame members 19 which are provided with a series of longitudinally spaced notches 19a for a purpose to be described below. The channel-shaped members 19 are connected together and supported in spaced relation by a pair of flexible strut members 21. To secure the channel members 19 to the strut members 21, the channel members have a pair of protuberances 19b extending from each of the ends. The struts 21 are formed with flatted end portions 21b which are adapted to be rigidly secured against the ends of the channel members 19. Suitable slots are formed in the end portions 21b to allow the protuberances 19b to extend therethrough. In order that the struts may be securely clamped to the channel members 19, end plates 22 are utilized to sandwich the flatted end portions 21b of the struts against the ends of the channel members 19. The end plates 22 are formed with parallel slots 22a which snuggly receive the protuberances 19b. To complete the assembly of the channel-shaped members 19, the struts 21 and the end plates 22, the protuberances 19b are staked over against the outer faces of the end plates 22.

In the undeflected or unstressed position of struts 21, as can be seen in FIG. 2, the struts assume a somewhat V-shape having angularly disposed portions 21c extending inwardly from the flatted portions 21b which are secured to the channel members 19. The inner ends of portions 21c of struts 21 are connected by a center support portion 21d.

The angularly extending portions 21c of the struts are formed with ribs 21e and longitudinally extending webs 21f. The ribs 21e and webs 21f are provided to strengthen the portions 21c of the struts against any bowing when subjected to longitudinal compression forces. Thus, when any forces are applied tending to urge the channel members 19 toward each other, the struts 21 are deflected only intermediate the end portions 21b and the angular portions 21c as well as between center support portion 21d and the portions 21c. Because of the longitudinal rigidity in the angular portions 21c, any change in the relative spacing between the channel members 19 is reflected in a change in the angular positions of the strut portions 21c and accordingly the horizontal displacement of center portions 21d of the struts.

To connect the center support portions 21d of the two struts 21, an elongated connecting rod 23 is secured to each strut. The connecting rod 23 also serves as an actuating member for the toaster switch as will be explained in detail below. In order to rigidly attach the connecting rod to the center portion 21d of struts 21, two plate members 25 and 26 are utilized to sandwich the center portions 21d of the struts therebetween. The inner plates 25 have threaded bushings 27 secured integrally thereto. The connecting rod 23 is formed with enlarged threaded end portions 23a which threadedly engage the bushings 27. The enlarged threaded portions 23a are adapted to extend through holes in the struts 21 and the plates 25 and 26. To clamp the plates 25 and 26 in sandwich relation to the center portion 21d of the struts 21, the threaded outer ends 23a of the connecting rod have nuts 29 threadedly received thereon. It should be understood that the threaded connections between connecting rod 23 and the struts 21 might easily be replaced by welded, riveted or staked connections. The struts 21 are formed of a material having a low coefficient of expansion and a high yield point at the temperature encountered within the toaster, i.e. 500° to 600° F. It has been found that 42 percent nickel steel provides a satisfactory material for this application.

The temperature responsive portion of the control mechanism 16 comprises a series of expandable wire member 31 which are connected between the channel members 19. As can be seen in FIGS. 1 and 2, the wire members 31 are received in the slots 19a of the channels 19. The ends of the wires 31 may be secured to the channels 19 by brazing, welding or merely crimping the ends around the channels 19. In order to get the greatest response possible, it is desirable to fabricate the wires 31 from a material having a high coefficient of expansion. Red brass has been found to posses suitable strength and expansion characteristics for this application.

In the subject invention the thermal responsive wires 31 serve not only as the control mechanism for the toaster but also perform the function of the guide wires which are conventionally used to position the toast with respect to the heating elements. As can be seen in FIG. 3, the toast 17 is positioned immediately adjacent the expandable wires 31 with the heating element 18 being spaced still further from the surface of the bread to be toasted. Under such conditions it has been found that the wires 31 will respond accurately to the surface temperature of the bread positioned within the toaster.

As was mentioned above, the principle of surface temperature response of an expandable wire position closely adjacent to the toasting bread for control purposes is disclosed in Hurxthal Pat. No. 1,540,628. Through the use of a plurality of expandable wires 31 which are spaced across the surface of the bread being toasted, it is possible to obtain very accurate control of the color of the bread being toasted. The average user of the toaster is interested in obtaining a certain overall toast color. Because of inhomogeneity in the bread and unevenness in the distribution of radiated heat to the bread surface, there is bound to be some uneveness in the toasting across the surface of the bread. The control wires 31 traverse the entire surface of one side of the bread. This arrangement provides a control means which responds to the average of the conditions found on the control side of the toast, since all the wires are connected to contribute to the control of the toasting cycle. In spite of light spots and dark spots on the toasted bread, the over-all toasting will be consistent from one cycle to the next since the control response is to the average of the surface temperature on one face of the toasting bread.

In order to utilize the expansion of the wires 31 to deliver a sufficient amount of force to actuate an electric switch controlling the energization of the toaster elements and to actuate a carriage latch, an over-center spring mechanism has been provided in which the combined forces of the five control wires 31 act to retain the switch in the set or cocked position. As viewed in FIGS. 1 and 2, the control mechanism 16 is shown in the released position which it assumes during the non-toasting period. To set or cock the control mechanism, the connecting rod 23 is moved to the left as viewed in FIGS. 1 and 2. This axial movement of the control rod 23 deflects the struts 21 until they assume the cocked or set position as shown by the dotted lines in FIG. 2. Since the struts 21 normally assume the shallow V-shape as shown by the solid lines in FIGS. 1 and 2, they are placed under stress when moved to the dotted position shown in FIG. 2 and have a tendency to return to their original or rest position. The struts 21 and the wires 31, however, form an over-center spring mechanism which retains the control mechanism in the cocked position. As shown by the dotted lines, the center portions 21d of the struts 21 are positioned slightly to the left of a line through the ends 21b of the struts. Thus, for the struts to return to their rest position, it is necessary for the ends of the struts 21 and the channels 19 to move outwardly slightly so that the center portion 21d may move through the center located position to the position of displacement in the opposite direction. The tensile force carried by the wires 31 is such that the channel members 19 are restrained against outward movement and the struts 21 are prevented from deflecting to their rest position.

As the control mechanism 16 responds to the surface temperature of the bread being toasted, the wires 31 begin to lengthen as a result of the increased temperature. After a certain amount of expansion has taken place in the wires 31, the struts 21 will be able to move the channel members 19 apart to such an extent that the over-center spring mechanism will release with a snap action. When this release occurs the deflection in the V-shaped struts 21, which has been impressed on the struts when the control mechanism was cocked, is released instantaneously with a result that the connecting rod 23 moves axially to the right, as seen in FIG. 2, very rapidly.

The cocking of the control mechanism may be performed manually at the commencement of the toasting cycle by merely moving the rod 23 axially to the left as shown in FIG. 2. Alternatively, the carriage mechanism of a pop-up toaster might easily be provided with a cam which would initially set the control mechanism 16 when the carriage was depressed. The cam would then disengage from the control mechanism so that the struts 21 and the rod 23 would be free to move to their initial or unset position. Cam mechanisms of this type are well known in the toaster art. In addition, the return movement of struts 21 at the end of the toasting cycle could be used to trip a latch to permit upward movement of the toaster carriage.

In order to energize and de-energize the heating elements 18, a switch member 33 is associated with the control mechanism 16. The switch 33 is connected in series with the heating elements 18 and is mounted on a suitable bracket 35 which is secured to the toaster base 15 by means of suitable screws or bolts. The switch 33 comprises a pair of contacts 37 and 39 mounted for movement relative to each other. Contact 37 is mounted on a rigid supporting arm 41 and is provided with a suitable connector 41a which connects it in circuit with the heating elements. The contact 39 is supported on a flexible conducting arm 43 which is mounted in spaced relationship to the rigid arm 41 with arm 43 formed to bias the contacts 37 and 39 into engagement. The lower end of the flexible contact supporting arm 43 is provided with a connector 43a which series connects the switch 33 in circuit with the heating elements. The contact supporting arms 41 and 43 are spaced from each other and from the mounting bracket 35 by ceramic insulators 45. A suitable assembly rivet or bolt 47 which is insulated from the contact supporting arms 41 and 43 assembles the ceramic insulators 45, the supporting arms 41 and 43 to the bracket 35 in the usual manner. Extending upwardly from the portion of the flexible arm 43 which supports the contact 39 is the control engaging portion 43b of the switch 33. The contact arm portion 43b carries at its outer end a ceramic insulating button 49 which is adapted to be engaged by the control mechanism 16.

One of the threaded end portions 23a of the connecting rod 23 is adapted to engage the ceramic insulating button 49 when the control mechanism 16 is in an unset position. When the connecting rod 23 is in engagement with the ceramic button 49, the flexible contact supporting arm 43 is deflected to such an extent that the contacts 37 and 39 are spaced from one another. When the connecting rod 23 is moved to the left, as seen in FIG. 3, to cock the control mechanism 16, the connecting rod 23 moves out of engagement with the ceramic button 49 and the contacts 37 and 39 engage to energize the toaster elements. In this way the control mechanism 16 operates on the switch 33 to energize and de-energize the heating elements at the beginning and end of the toasting cycle.

In any automatic pop-up toaster it is necessary to provide a color adjustment so that toast can be obtained which has been cooked to varying degrees. In making a color adjustment for the control mechanism 16, it is necessary to provide an adjustment which will vary the temperature at which the control mechanism 16 opens the switch 33. Many different types of biasing means may be utilized to perform this function. A simple form of color adjustment is shown in FIG. 1 wherein a color control knob 51 is mounted so that it will be positioned exteriorly of the toaster shell and may be readily adjusted by the operator. The color control knob 51 is secured to a rotatably mounted shaft 53. To support the control shaft 53 so that it may be moved axially to effect the control function, an L-shaped bracket 55 is mounted on the toaster base 15. The L-shaped bracket 55 has mounted at its upper end a threaded bushing 57 which is engaged by a threaded portion 53a on the control shaft 53. Thus, rotation of the color control knob 51 effects an axial displacement of the control shaft 53.

The control rod 53 and mounting bracket 55 are so positioned that the end 53b of control rod 53 may engage one of the threaded end portions 23a of the connecting rod when it is in the cocked position shown by the dotted lines in FIG. 2. Rotation of the control rod 53 serves to vary the position of connecting rod 23 and to vary the angular disposition of the strut portions 21c when the control mechanism 16 is in the cocked position. This variation in the cocked position of connecting rod 23 changes the temperature to which the wires 31 will have to be subjected to expand enough to allow control mechanism 16 to snap over to its uncocked position. Looking at FIG. 2, if the control rod 53 is advanced to the right to such an extent that the center portion 21d may move to a position a very small distance to the left of the center line of the strut mounting, very little expansion will be required to cause the struts 21 to deflect to their initial position. In this manner the color adjustment for control mechanism 16 is accomplished. With the control rod 53 advanced axially to the right, as seen in FIG. 1, the control mechanism 16 will be set to produce toast of light color since very little temperature rise at the surface of the bread will be required to actuate control mechanism 16. On the other hand, if control rod 53 is moved to the left, a higher temperature will be required to actuate control mechanism 16.

Control mechanism 16 has several advantages which result from the novel aspects of its construction. One of the main problems in developing a satisfactory toaster switch is the elimination of friction from the moving parts of the mechanism so that it will respond with uniformity in spite of the high temperatures to which it must constantly be exposed. Any frictionally engaging metal parts which must move relative to each other in the actuation of the control mechanism tend to bind and require varying amounts of force to effect the relative movement of the parts. Control mechanism 16 completely obviates this problem by presenting a substantially frictionless mechanism which operates with a snap action to assure uniformity of response. In the entire mechanism there are no parts which slide or rotate relative to each other. The operation of control mechanism 16 depends only on the expansion and contraction of the wires 31 and the deflection of the resilient struts 21. Neither the expansion of the wires nor the deflection of the struts results in any friction effects which might lessen the consistency of response. The substantial amount of force delivered by the snap action of mechanism 16 is more than ample to quickly disengage the carriage latch of the bread toaster. In addition, the wires 31 perform the function of the guide wires which are conventionally used in pop-up type toasters. The mechanism 16, therefore, is not only an effective surface temperature responsive control mechanism but it also eliminates the necessity for some conventional components of the toaster.

While only a single embodiment of the present invention has been described and illustrated it should be understood that the present invention is capable of various changes and modifications. It is intended in the appended claims to cover all such changes and modifications as fall within the true spirit and scope of the present invention.

What is claimed as new and desired to be secured by Letters Patent of the United States is:

1. A bread toasting device comprising a base, vertically positioned heating elements mounted on said base, a pair of spaced frame members mounted on said base adjacent to said heating elements, vertically extending thermal responsive guide wires interconnecting said frame members, a pair of bowed connecting members extending between the adjacent ends of said frame members, said thermal responsive wires maintaining said connecting members in a bowed position, means cooperating with said thermal responsive wires to support a slice of bread in the vertical position, said wires being positioned between said bread slice and said heating elements, means for deflecting said bowed members in a direction reversed from said bowed shape, said bowed members in their deflected positions being self-biased toward their undeflected positions, switch means mounted on said base and connected in circuit with said heating elements, and actuating means on said switch for opening said switch when said bowed members move to their undeflected positions.

2. A thermal responsive control device for a toaster comprising a pair of spaced frame members, a pair of resilient bowed connecting members extending between and supporting said frame members in opposed spaced relation, a plurality of parallel spaced thermal responsive wires secured to said frame members to maintain the bowed shape of said connecting members and restrain said frame members from moving apart, means interconnecting said bowed members so that they deflect in unison, and means for deflecting said bowed members in a reverse direction from said bowed shape, said bowed members in their deflected positions being self-biased toward their undeflected positions whereby said bowed members snap from their deflected to their undeflected positions upon heating of said thermal responsive wires.

3. A thermal control device responsive to the temperature of a surface area comprising a pair of spaced parallel frame members mounted for limited movement toward and away from each other while maintaining their parallel relationship, a pair of resilient members interconnecting the spaced ends of said frame members and supporting said members relative to each other for said limited movement, a plurality of parallel thermal responsive wires extending between said frame members, said wires being connected at spaced points along the lengths of said frame members, and switch means connected to said resilient members and responsive to the spacing of said frame members.

4. A thermal control device responsive to the temperature of a surface area comprising a pair of spaced parallel frame members mounted for limited movement toward and away from each other while maintaining their parallel relationship, a pair of resilient bowed members interconnecting the spaced ends of said frame members and supporting said members relative to each other for said limited movement, means interconnecting the center portions of said bowed members to maintain said parallel relationship, a plurality of thermal responsive wires extending between said frame members, said wires being connected at spaced points along the lengths of said frame members, means for deflecting said bowed members in a reverse direction from said bowed shape, said bowed members in their deflected positions being self-biased toward their undeflected positions whereby said bowed members snap from their deflected to their undeflected positions upon heating of said thermal responsive wires, and switch means connected to said bowed members and responsive to the movement of said bowed members between their deflected and undeflected positions.

References Cited in the file of this patent
UNITED STATES PATENTS

| | | |
|---|---|---|
| 1,923,509 | Rozumek | Aug. 22, 1933 |
| 2,030,932 | Persons | Feb. 18, 1936 |
| 2,132,622 | Ireland | Oct. 11, 1938 |
| 2,177,671 | Schmidinger | Oct. 31, 1939 |
| 2,267,164 | Newton | Dec. 23, 1941 |
| 2,307,497 | Hausler | Jan. 5, 1943 |
| 2,421,915 | Tousignant | June 10, 1947 |
| 2,719,893 | Brady | Oct. 4, 1955 |

FOREIGN PATENTS

| | | |
|---|---|---|
| 817,122 | Great Britain | July 22, 1959 |